United States Patent [19]

Stone, Jr. et al.

[11] 3,812,538

[45] May 21, 1974

[54] TRANSVERSELY BANDED FILM FOR MAKING EDGE MARKED MAGNETIC TAPE

[75] Inventors: Wayne B. Stone, Jr., Bethesda, Md.; Alan Beaumont, Stamford, Conn.

[73] Assignee: Indexette Tapes, Inc., New York, N.Y.

[22] Filed: Dec. 8, 1971

[21] Appl. No.: 206,055

Related U.S. Application Data

[63] Continuation-in-part of Ser. No. 199,475, Nov. 17, 1971.

[52] U.S. Cl. .......................................... 360/134
[51] Int. Cl. .......................... G11b 5/70, G11b 23/28
[58] Field of Search .......... 274/42, 43; 352/92, 236, 352/234, 172; 33/128, 137; 179/100.2 B, 100.2 A, 100.2 E; 264/171, 245; 161/6.5; 425/130, 132

[56] References Cited

FOREIGN PATENTS OR APPLICATIONS 1,491,757 7/1967 France ................................ 274/4 C

*Primary Examiner*—Harry N. Haroian
*Attorney, Agent, or Firm*—Colton & Stone, Inc.

[57] ABSTRACT

The indefinite length base film destined for use as the substrate to which will subsequently be applied a magnetic coating to produce magnetic tape is initially formed with distinctively colored bands extending transversely of the film throughout the thickness thereof and spaced along the length of the film. Following a conventional magnetic coating step, the film is conventionally cut along multiple parallel lines, longitudinally of the film, to form a plurality of magnetic recording tapes. The colored bands are thus exposed along each of the cut side edges of each tape at spaced intervals along the length thereof. When the tape is wound on a reel, the distinctively colored side edge portions appear as concentric bands upon viewing either side edge of the wound tape.

9 Claims, 9 Drawing Figures

PATENTED MAY 21 1974

3,812,538

SHEET 1 OF 2

TRANSVERSELY BANDED FILM FOR MAKING EDGE MARKED MAGNETIC TAPE

CROSS REFERENCE TO RELATED APPLICATION

This is a continuation-in-part of copending application Ser. No. 199,475 filed Nov. 17, 1971 and entitled Magnetic Tape Having Edge Marked Cue Indicia For Direct Viewing in a Tape Cartridge and Method and Apparatus For Making and Using the Same.

BACKGROUND OF THE INVENTION

A practical and economical solution to the commonly experienced difficulty attendant the location of a particular recorded selection along the length of a wound recordable web has been proposed in applicants' copending application Ser. No. 199,475 filed Nov. 17, 1971. Basically, the solution involves cue edge marking of the recordable web at spaced intervals along the length thereof. The spaced edge markings assume a configuration of spaced concentric bands when a wound reel of the marked web is viewed parallel to the axis of reel rotation.

The environment in which the invention finds an important application is the edge marking of audio and/or audio visual tapes destined for use in tape cartridges. The well known "cassette" cartridge is a typical example.

The advantages in edge marking of a recordable tape or web as contrasted with previously known methods of locating desired program selections are set out in great detail in the aforesaid copending application.

A conventional method of fabricating magnetic tapes involves the formation of a wide indefinite length base film such as polyethylene terephthalate or the like, coating of the base film with a magnetic coating and slitting or cutting the same along parallel lines longitudinally of the length thereof to produce the individual magnetic tape lengths for subsequent assembly with a tape cartridge housing in conventional manner.

The usual base film substrate is transparent and the particular color of the finished magnetic tape is due to the color of the magnetic coating applied thereto.

It is the purpose of the invention to create variations in the color or visual appearance of the tape and particularly as viewed in the wound condition on a reel.

SUMMARY OF THE INVENTION

The present invention is directed to a recordable web whose base film, i.e., the non-magnetic substrate to which the magnetic coating is applied, is formed in such a manner as to inherently produce the edge cue markings when the coated base film is cut longitudinally of its running length to create a plurality of magnetic tapes.

An arbitrary but conventional length of running tape which is normally left unrecorded between recorded selections is approximately eight inches and it has been found that edge cue marking of a conventional cassette tape over this interval is sufficient to produce a readily visible cue band when viewed through the viewing window of a conventional cassette cartridge. The variations in reaction time on the part of various users when switching from fast forward or rewind speed to normal play speed is such that it is generally desirble to provide a somewhat longer edge marked portion which may overlap the non-recorded pause interval and one or both adjacent selections if desired, since the recording and playback properties of edge marked tape constructed in accordance with the present invention are not affected by the cue indicia or edge marking. Rather, the particular recording tape of this invention is specifically designed to be recorded over at least some of the edge marked intervals. This for the reason that magnetic tapes constructed as disclosed herein are primarily for use in non-recorded cartridge sales as opposed to pre-recorded cartridge sales.

In the case of non-recorded tape cartridges, the purpose of the purchase is for the user to record his own selections and although the user may edge mark his own tapes at desired intervals at the time of recording as disclosed in the aforesaid copending application, it is desirable that the tapes be premarked along various intervals to avoid the necessity of home marking. Thus, assuming a typical non-recorded tape cartridge to include edge markings along equally spaced tape intervals, after one recording is completed which may extend across one or more of the pre-marked edge portions the user simply advances the tape to the next cue mark before commencing the recording of another selection.

The manner in which the edge marking is accomplished in such a manner as to insure that recording and playback fidelity is not affected and which involves no alteration in the conventional manufacturing process except in the production of the film substrate will become more apparent from the following specific description of one method of producing a cue edge marked magnetic tape.

DESCRIPTION OF THE PREFERRED EMBODIMENTS

Figure 1:
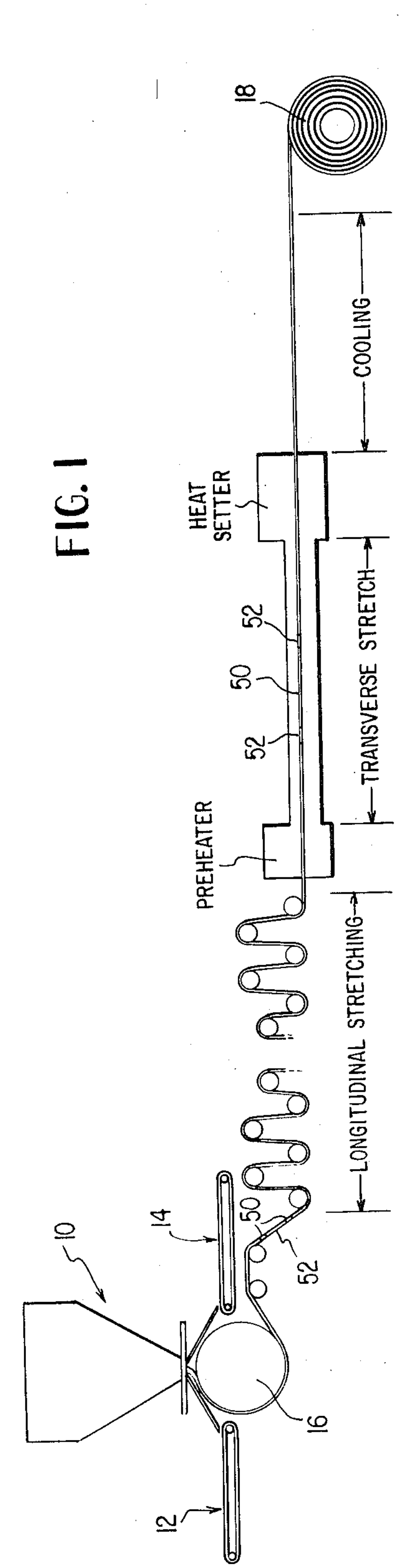
FIG. 1 is a diagrammatic illustration of the formation of a transverse banded base film.

In FIG. 1 is diagramatically illustrated the formation of a transversely banded thin film substrate destined for use in the manufacture of multiple magnetic recording tapes. The apparatus illustrated in FIG. 1 is conventional in all respects except for the details of the narrow slit orifice extruder 10 and recycling conveyors 12, 14. The extruder 10 extrudes a suitable molten plastic, such as polyethylene terephthalate, onto a cooling drum 16 from whence the sheet-like extrudate is conducted serially through longitudinal stretching, preheating, transverse stretching, heat setting and cooling stations prior to its take up, in the form of a wide thin film, on take up reel 18. The extrudate issuing from extruder 10 exhibits transverse bands of distinctive coloration at spaced intervals along the length thereof by virtue of the extruder construction illustrated in FIGS. 6–9.

The interior of extruder hopper 20, as illustrated in FIGS. 6–9, is longitudinally divided by a center wall 22 terminating in a lower knife edge 24. The opposite ends of hopper 20 may be mounted in ways, not shown, for limited reciprocal movement relative to an underlying extruder plate 26 between the positions of FIGS. 6 and 9 under the control of any desired power means indicated by the arrows 28. An appropriate film forming material is conventionally introduced into hopper chambers 30, 32 on either side of center wall 22. The molten material 34, 36 in chambers 30, 32, respectively, is identical except for the presence of a distinctive coloring, dye or pigment in material 34. Extruder plate 26 includes three extrusion orifices 38, 40, 42 adapted for the respective delivery of extrudate to recycle conveyor 12, cooling drum 16 and recycle conveyor 14. With the hopper 20 positioned as in FIG. 6 relative to extruder plate 26, colored extrudate 44 from chamber 30 passes to conveyor 12 for recycling to chamber 30 in a manner not illustrated in the drawings while extrudate 46 from chamber 32 passes onto the periphery of cooling drum 16 in conventional fashion.

Figures 5, 6, 7, 8, 9:
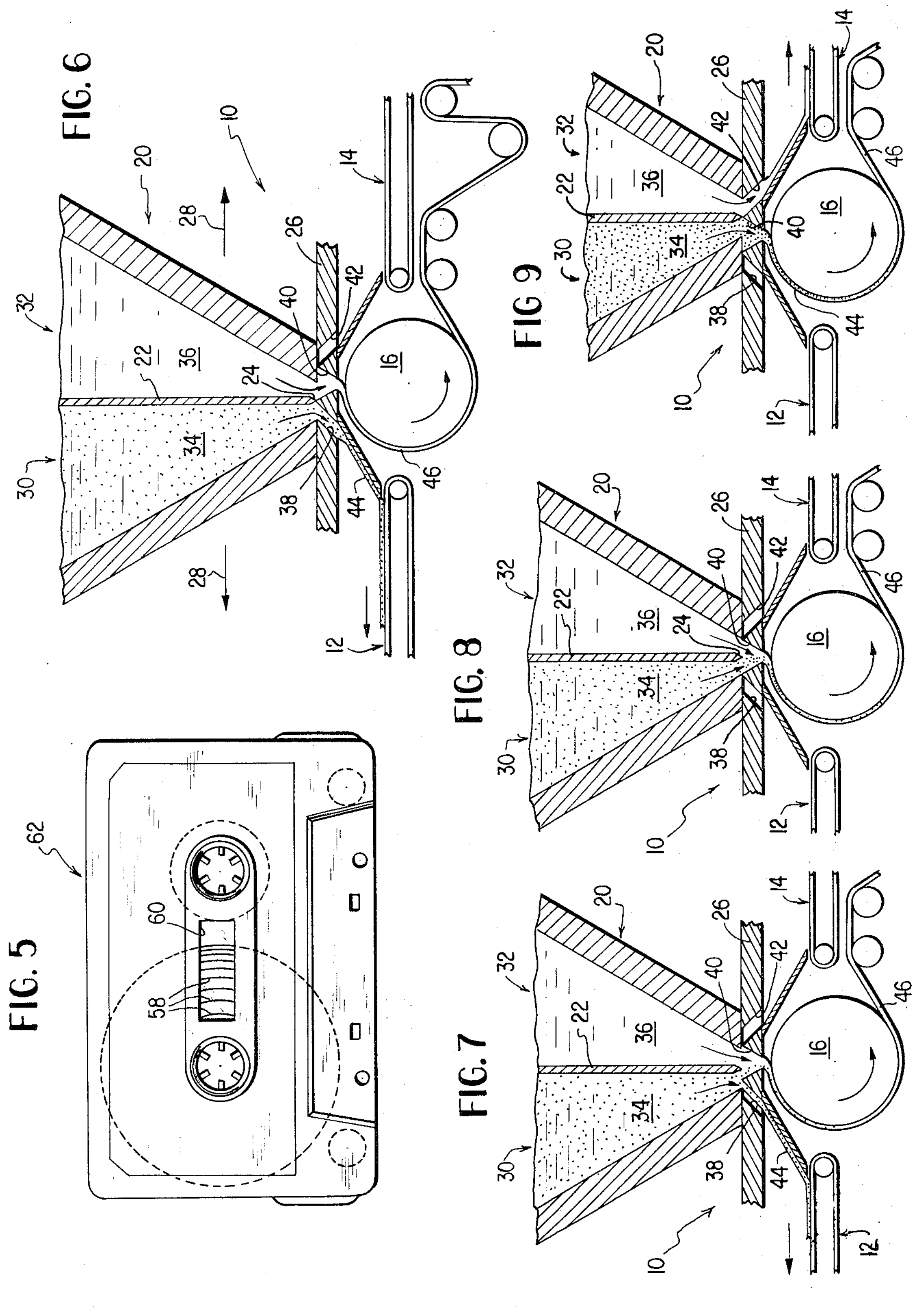
FIG. 5 is a plan view of a tape cartridge including a cue edge marked tape whose wound side edge is exposed through the cartridge viewing opening.
FIGS. 6–9 are schematic detail views of an extruder/-hopper configuration to produce the banded film substrate.

After a desired length of extrudate 46 has issued from orifice 40, as calculated in accordance with the known parameters of the longitudinal and transverse stretching sections, to represent a desired interval between cue edge markings in the finished magnetic tape; the extruder hopper is progressively shifted in the direction of the right hand arrow 28 as viewed in FIG. 6 through the positions of FIGS. 7 and 8 to the position of FIG. 9. It will be seen that as the hopper is moved through the positions of FIGS. 7 and 8 a progressively greater proportion of colored material 34 is delivered to extrusion orifice 40 for delivery to cooling roll 16 along with a similarly decreasing proportion of the material 36. When the position of FIG. 9 is reached all of the material 36 is being diverted to recycle conveyor 14 for subsequent recycling to chamber 32 while all of the colored extrudate 44 from chamber 30 is being delivered to roll 16. After a short time interval, the hopper is again shifted back to the position of FIG. 6 for delivery of a longer interval of non-colored extrudate 46 to the cooling roll. Repetition of the aforedescribed cycle results in alternate colored and uncolored segments of the extrudate delivered to drum 16 which results in similarly spaced bands in the finished film substrate 48 as illustrated in FIG. 2.

Figure 2:
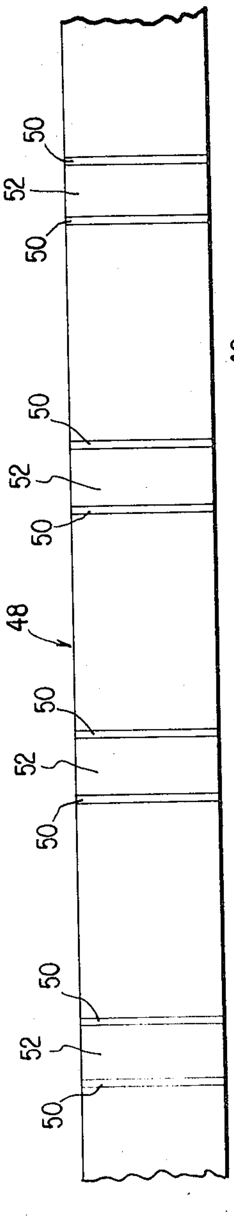
FIG. 2 is a plan view of a segment of the film substrate as it would appear prior to the application of a magnetic coating.

The conjoint extrusion of materials 34 and 36 onto the cooling drum as the hopper moves through the positions of FIGS. 7 and 8 results, of course, in a blending of the colored and uncolored material on either side of the colored segments which show up as blended segments 50 in the finished film 48 of FIG. 2. These blended semgents have no effect on the production of the edge marked tapes since it is only necessary that there be clearly marked segments as is produced by the extruder position of FIG. 9 and it is immaterial that there is some blending of material to either side thereof. The segments or bands 52 of fully colored material, as shown in FIG. 2, are the portions that produce the visible cue marking on the side edges of the finished tapes. The reason for the extruder design whereby a continuous flow of both materials takes place resulting in the presence of the blended positions 50 is to avoid any disruption of smooth flow of the relatively viscous materials 34, 36 onto the cooling roll. Thus, it will be appreciated that it is impractical to start and stop the flows of the separate materials if a continuous extrusion is to issue onto roll 16 and insure the continuity and integrity of the finished film. Through the use of the disclosed extruder construction a continuous smooth flow is insured even while one material is being substituted for another.

It is obvious that both of the materials 34, 36 could be distinctively colored, if desired; it being only necessary that the two materials present a visual contrast when viewing a cut side edge of the film after the same has been coated in a conventional manner. In this latter regard, it will be appreciated that the opposed surfaces of a finished magnetic tape assume the overall coloration of the coating material which is, conventionally, of a generally brownish color which is due to the presence of the magnetic material in the coating typified by iron oxide and chromium dioxide. In a conventional tape, the wound side edge of the tape also exhibits substantially this same brownish coloration. It has been found that bright yellow presents an excellent contrast to this brownish color. Accordingly, an exemplary base film constructed in accordance with the invention would include bright yellow transverse bands 52 separating longer substantially transparent intervals therebetween. A subsequent magnetic coating applied to the film substrate produces a coated film having the usual brownish appearance but once the coated film is cut to expose the bright yellow bands along a cut side edge, the color contrast is readily apparent.

Figure 3:
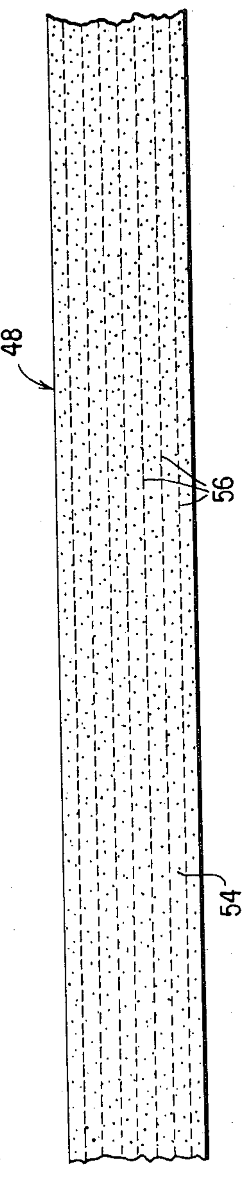
FIG. 3 is a plan view of a segment of the film substrate of FIG. 2 following a conventional magnetic coating operation and including dashed line diagrammatic illustrations of the parallel cutting pattern to produce individual magnetic tape lengths.
Figure 4:
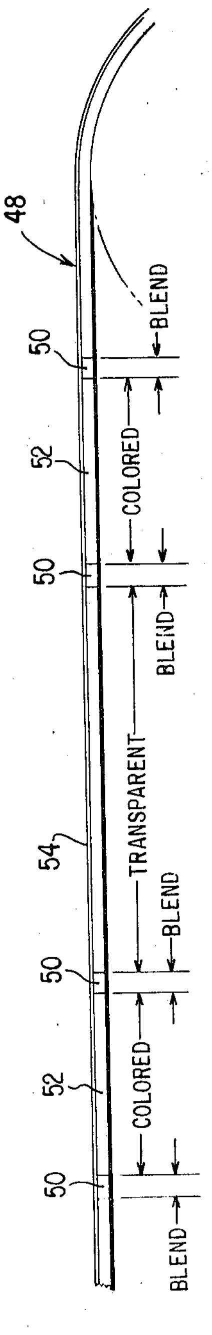
FIG. 4 is a side elevational view of an individual tape exposing a cut side edge thereof.

Following the production of film substrate 48, the same is coated with a conventional magnetic coating 54 as indicated in FIG. 3. Thereafter the film 48 and coating 54 is cut or slit along lines 56 to produce a plurality of magnetic tape lengths each of the cut side edges of which expose the colored bands 52 as shown in FIG. 4.

When the individual tapes are wound on the reel or reels of a conventional cassette, as shown in FIG. 5, the exposed outside edges of the bands 52 present an appearance of concentric colored bands 58 with segments of each of the concentric bands being clearly visible through the viewing window 60 of tape cartridge 62.

It will be apparent that the banded base film may be fabricated from any of the materials conventionally used as the non-magnetic substrate in magnetic tape manufacture subject only to the requirement that it be susceptible of being colored or impregnated throughout the thickness of the film at spaced locations therealong. Thus, in addition to the use of polyethylene terephthalate, other suitable substrates may include cellulose acetate, oriented polyvinyl chloride and even paper.

It will be apparent that the transverse colored bands could be discontinuous in their extent across the width of the base film so long as colored portions intersect the cutting planes indicated at lines 56 in FIG. 3. Similarly, the colored bands could extend parallely crosswise of the film at angles other than perpendicular to the running length of the film since, insofar as each completed magnetic tape is concerned, it is only necessary that the colored band be exposed along a cut side edge at regular recurring intervals.

We claim:

1. A magnetic tape including a film substrate having transverse indicial bands spaced along the length thereof and extending throughout the thickness of said film substrate and between the side edges thereof whereby said indicial bands are exposed at the side edges of said tape; and a magnetic coating overlying the width of said film substrate.

2. The magnetic tape of claim 1 wherein said indicial bands comprise colored portions contrasted with the remainder of said film substrate.

3. The magnetic tape of claim 1 wherein said film substrate comprises polyethylene terephthalate and copolymers thereof.

4. The magnetic tape of claim 1 wherein said indicial bands are substantially parallel to one another and angularly related to the longitudinal axis of said magnetic tape.

5. The magnetic tape of claim 4 wherein said indicial bands are perpendicularly related to the longitudinal axis of said magnetic tape.

6. A reeled magnetic tape including a film substrate; said film substrate exposing color contrasted indicial markings spaced along the length thereof to define a plurality of concentric cue bands as viewed parallel to reeled axis of said tape; said color contrasted indicial markings extending throughout the width and thickness of said film substrate; and a magnetic coating overlying the width of said film substrate.

7. The reeled magnetic tape of claim 6 wherein said film substrate comprises polyethylene terephthalate and copolymers thereof.

8. The reeled magnetic tape of claim 6 wherein said indicial markings comprise substantially parallel bands angularly related to the longitudinal axis of said tape.

9. The reeled magnetic tape of claim 8 wherein said indicial markings are perpendicularly related to the longitudinal axis of said tape.

* * * * *